United States Patent Office.

JULIUS AUGUSTUS ROTHE, OF PHILADELPHIA, PENNSYLVANIA

Letters Patent No. 98,712, dated January 11, 1870.

IMPROVED MODE OF TREATING VEGETABLES, TO OBTAIN FIBRE FOR PAPER, &c.

The Schedule referred to in these Letters Patent and making part of the same.

*To all whom it may concern:*

Be it known that I, JULIUS AUGUSTUS ROTHE, of the city of Philadelphia, and State of Pennsylvania, have discovered a new and useful Means or Method by which I Produce a Reliable, Cheap, as well as Substantial Material for Paper, differing in its nature from any and all now known and applied conditions of the first raw stock as now generally used at paper-mills. A clear description of my discovery will follow below.

All the endeavors made by scientific and practical paper-makers since 1849, (I myself one of them,) and all the processes patented since, the raw materials selected and used in the manufacture of paper, do not, as yet, accomplish or satisfy the desired means or substitute for the rag-traffic as now carried on. The paper-manufacturer is still subjected, with all his operatives, to the nuisance of the filthy rag, as well as the dealers therein, carriers of the same, &c., being exposed to the epidemics transported and carried therein from country to country, even across the ocean. Wherever the paper-manufacturer locates his mill, he is compelled, by the operation therein, to wash that filth from his "Hollander" into the next stream, causing the water to become impure and unhealthy, often endangering the health of millions of human beings, which, as a reference, is the location of the paper-mills above the water-works for the city of Philadelphia.

All the vegetables as now used and selected for the manufacture of paper are in a ripe state or condition, and they are only then used when their seeds are removed and the stems or stalks matured. This condition of the straw or cane, &c., causes the fibres therein to be naturally bound solid by silex, and their other components have become woody, so that the textile nature of the same is in a great measure ruined, and so closely bound together that it requires very strong solutions of chemicals, as well as costly steam-arrangements, in order to make pulp for paper thereof.

The endeavors made since 1849 to find a reliable substitute for rags, with all the capital and talent expended in that direction and for that purpose, have thus far met with no reliable success. It is known that wood and many other vegetable materials are converted into paper, but it is also known that the manipulation thereof is yet too expensive to make them a substitute for rags.

The nature of my discovery differs from any now applied to practice, and I will now proceed to illustrate the same, so that others skilled in the art of paper-manufacture may understand and use the same.

I make no particular reference to any plant I use, but I prefer broom-corn, Indian corn, &c., for my original or raw stock. I sow the seeds of those plants broadcast on the field, so that while their stems grow upward, they grow close to one another, which prevents them to drive for or bearing seeds, and consequently their stems accumulate no silex, nor do they become woody, but in that position grow similar to flax. They set their fibres as they grow, and retain their textile nature, while their components remain solvable, even in boiling water, and without the aid of alkalies.

I also prefer to sow the seeds in the latter part of July and the month of August, according to the location of the soil, as in that part of the year the fibres remain in a softer condition than when sown in spring. Said plants, when sown and raised as above specified, generally obtain a height from two to three feet. I cause those plants to be harvested like hay, and then baled for transportation.

I take my unripe or green stock, as described, and, after it is brought to the place where I want to treat it, I have it cut by any suitable means into lengths of from one to two inches, and then boil it in water alone, for a period of about four hours, in which the gum, sap, &c., are solved from the fibres, and all other matter not fibrous is thereby made liquid, so as to be acted upon by hot water, for the purpose of washing said solved matter from the fibres. But I find that after the washing in hot water, some gummy, oily matter, combined with the natural coloring-matter, must be removed chemically.

After the material is well crushed by mechanical means, it requires to be treated in a bath acidulated, as a preparatory process in bleaching, in and for the purpose of economizing in the use of bleaching-agents. This bath I make about 2° Baumé.

The pulp made and obtained of my stock will be found to suit any of the very best qualities of paper now manufactured for printing and writing-purposes.

The reduction of my described stock into pulp requires no such strength of power, nor does it require the high degrees of steam as now used in the manipulation of rags, and the ripe and woody vegetable substances as now employed. There is likewise abundant land in all the States of the Union, such as has been used for pasture through the fore part of the summer, and which is intended for Indian corn the next coming year. A full crop of my stock can be raised on such land without interfering with the customary rotation of the farmer's work, but adding an additional profit to the produce of his land.

Having thus described the production of my stock, its nature, and quality, as compared with the materials now used in the manufacture of paper, and the reason of its economical reduction into textile fabrics,

What I claim, therefore, as my invention, and desire to secure by Letters Patent, is—

Solving the gums of the plants named, by boiling the same in water, and, after washing in hot water, to remove thereby as much as possible the solved gummy, &c., matter, and in combination with the same, the acidulous bath, made so by sulphuric acid, added to the water containing the material for paper, &c.

JULIUS AUGUSTUS ROTHE.

Witnesses:
JAMES S. GRINNELL,
J. C. TASKER.